July 3, 1962

M. MARDER 3,041,911

BIRD OPERATED MUSIC BOX

Filed Feb. 29, 1960

INVENTOR.
Michel Marder
BY
Michael S. Striker
Attorney

United States Patent Office 3,041,911
Patented July 3, 1962

3,041,911
BIRD OPERATED MUSIC BOX
Michael Marder, New York, N.Y.
Filed Feb. 29, 1960, Ser. No. 11,931
4 Claims. (Cl. 84—94)

This invention relates to a music box which can be operated by a perching bird.

It is an object of this invention to provide a music box having a musical movement which can be operated by a bird perching on a support.

It is a further object of this invention to provide a music box having a musical clockwork movement which will operate when a bird perches on a supporting member and will stop operating when the bird has left the supporting member.

It is a further object of this invention to provide a music box resembling a bird house and operated by a bird so that the bird is induced to sing by the operation of the musical movement.

It is still a further object of this invention to provide a music box including a mirror and a perch for a bird located in front of the mirror so that a bird sitting on the perch and seeing a bird image in the mirror while hearing musically reproduced sounds, possibly resembling the song of birds, will be induced to compete with the imaginary bird by singing or whistling.

With these objects in view, the present invention provides a bird-operated music box comprising, in combination, a musical movement located on a housing, blocking means having a blocking position in which the musical movement does not operate, and a bird-supporting member protruding from the housing and movable by a bird for causing movement of the blocking means to a position releasing the musical movement.

Further provided are biasing means permanently urging the bird supporting member into an upper position so that a bird perching on the bird supporting member will move the same from the upper into its lower position against the bias of the biasing means to operate the musical movement. Upon termination of the perching of the bird on the bird supporting member, the same will allow the blocking means to return to an upper position, thus causing movement of the blocking means into the blocking position and stopping of the musical movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
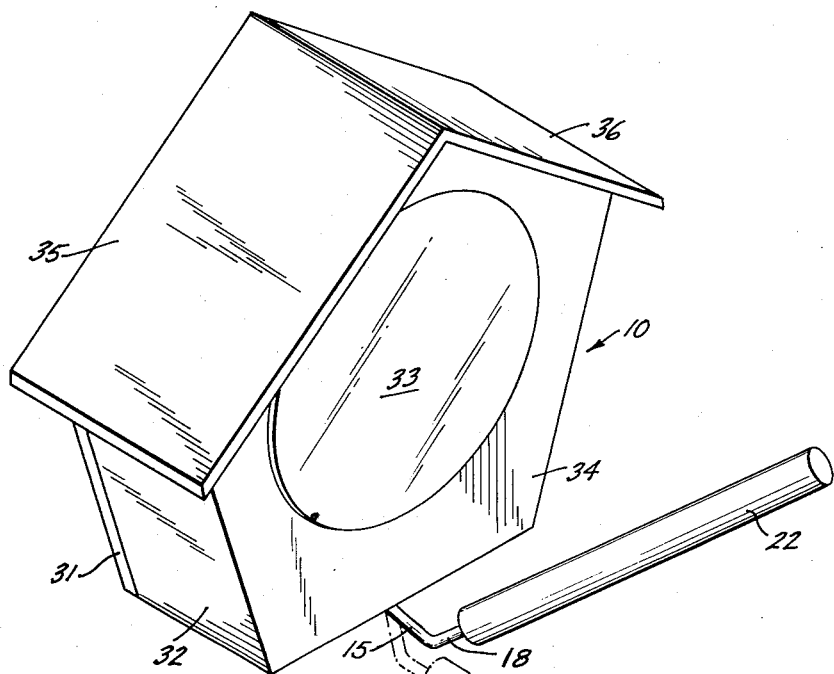
FIG. 1 is a perspective view of the device of the present invention.

Referring now to the drawing, a housing 10 includes a base or rear wall 31, a side wall 32, a front wall 34 and a roof structure 35 and 36. Wall structure 34 and roof structure 35, 36 form a cover for said base and resemble a bird house. A mirror 33 is fixed to the front wall 34 and simulates a door opening. A musical clockwork movement 50 of conventional design and as shown, for example, in Patent No. 2,721,531 is mounted on the rear wall 31. An opening, not shown, is formed in the rear wall 31 for insertion of a key, so that the clockwork movement can be wound up in a conventional manner from outside of the housing.

Blocking means 11 include a spindle 12 mounted for rotation on the musical movement and including a rotatable blocking member 19 having lever arms 13 and 14 fixed to spindle 12 as known from the aforementioned patent. The blocking means 11 are connected to the musical movement 50 in such a manner as shown by Patent No. 2,721,531 that the blocking means will rotate when the musical movement operates and the musical movement will be stopped when the blocking means is prevented from rotating. The connection between blocking means 11 and musical movement 50 may be formed by a train of gears (not shown) or in any other conventional manner.

A bracket 26 is fixed to the rear wall 31 below the blocking means 11 by rivets 27. Bracket 26 is bent to form with the rear wall a first bearing 28 and also has a second bearing 29.

Actuating means 20 comprise a bent rod 21 having a blocking portion 17 lying in the path of rotation of levers 13 and 14 of the blocking means, an intermediate portion 16 arranged for turning movement in the bearing 29, a second intermediate portion 15 being located partly within the housing 10 and partly protruding from an opening (not shown) between the lower ends of wall 31, 34 of the housing 10 and a perch portion 18 arranged at an angle to intermediate portion 15. The bird supporting portion 18 has its outer end inserted in the perch member 22, which has the form of a wooden rod 22. A spring 23 is mounted in bearing 28 and has its outer end formed with a loop 25 surrounding and engaging intermediate portion 15 of the actuating means.

Figure 2:
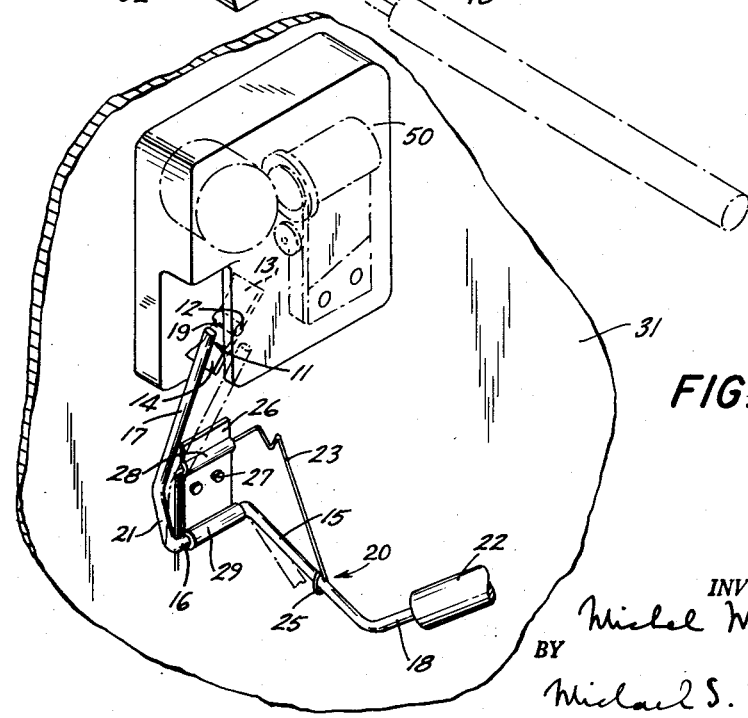
FIG. 2 is a perspective fragmentary view of the device of the present invention showing more clearly the construction thereof.

Spring 23 permanently urges bird supporting member 18 with the perch rod 22 mounted thereon into an upper position shown in FIG. 2 and indicated in FIG. 1 by solid lines. In this upper position, portion 17 of the actuating means lies in the path of the levers 13 and 14 so that the blocking means will be prevented from rotation when one of the levers 13 and 14 abuts against blocking portion 17.

When the blocking means are prevented from rotation by the portion 17 of the actuating means, the blocking means will be held in a blocking position and prevent operation of the musical movement.

When the actuating means are moved into a lower position, that is, the position indicated in dotted lines on FIG. 1, against the permanent urge of the biasing means 23, portion 17 of the actuating means moves away from the blocking position adjacent the rear wall 31 and out of the path of rotation of the lever arms 13, 14 of the blocking means. The musical movement will now operate due to the action of its spring, until the actuating means are returned into their upper position due to the action of the permanently applied force of the spring 23 when the bird moves away. The perch rod 22 on the outer end of the portion 18 of the actuating means provides an invitation to a bird to perch thereon. The force of the spring 23 can be adjusted so that the weight of the respective bird is sufficient to move the actuating means to their lower position. This adjustment can be effected by inserting the fingers or a gripping tool through the opening (not shown) between the lower ends of wall 31, 34 of the housing 10 and by creating a bend in the spring 23 to provide a permanent set therein and thus causing the tension thereof to be increased or decreased according to the location and the extent of bending.

A member of birds, such as parakeets, are attracted by mirrors and they will willingly perch on perch rod 22. Birds will learn that perching on rod 22 is followed by the sound of musical tones. Quite a number of birds like music and will therefore perch on rod 22.

Furthermore, the operation of the musical movement will induce some birds to whistle or sing and they will soon learn to repeat musical tones emitted from the musical movement.

Furthermore a perching bird will see the image of a bird in the mirror and at the same time hear the music emitted from the music box. The perching bird will tend to compete with the imaginary bird by repeating the musical notes of the music box or by singing its own tunes. In either case the perching bird is taught and induced to sing.

In this manner, an amusement and teaching device for birds is provided which acts automatically upon perching of the bird on the perch 22 of the actuating means.

When the bird is off the perch 22, the force of spring 23 will return the actuating means to their position indicated in FIG. 2 in which portion 17 lies in the path of the lever members 13 and 14 so that the blocking means 11 will be held in their blocking position.

While the invention has been illustrated and described as embodied in musical clockworks, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitutes essential characteristics of the generic or specific aspects of this invention and, therefore, such adaptations should and are intended to be comprehended within the meaning and range of equivalence of the following claims.

What is claimed as new and desired to be secured by Letters Patent is:

1. A bird operated music box assembly comprising a vertically arranged base; a music box mounted on said base, said music box having a rotatable governor or the like, said governor or the like having arms; a bird perch pivotally mounted on said base, said perch having an outwardly extending perch portion and having operatively associated therewith a blocking member movable from a blocking position in the path of rotation of said governor or the like to an inoperative position out of said path when a bird is on said perch; and a spring operatively connected to said base normally urging said blocking member into said path of movement of said governor or the like.

2. A music box assembly according to claim 1, wherein said outwardly extending perch portion is inclined in upward direction when said blocking member is in blocking position and assumes a substantially horizontal position when a bird is on said perch.

3. A music box assembly according to claim 1 further comprising a cover secured to said base and surrounding said music box, said base and said cover resembling a bird house.

4. A music box assembly according to claim 1, further comprising bracket means fixed to said base and having first bearing means for said perch and forming with said base second bearing means for said spring.

References Cited in the file of this patent

UNITED STATES PATENTS

| | | |
|---|---|---|
| 56,407 | Gunther | July 17, 1866 |
| 180,204 | Colburn | July 25, 1876 |
| 2,494,656 | Grunicke et al. | Jan. 17, 1950 |
| 2,700,247 | Cohn | Jan. 25, 1955 |
| 2,721,531 | Findley | Oct. 25, 1955 |
| 2,752,877 | Starkenburg | July 3, 1956 |